US012772111B2

(12) United States Patent
Hill et al.

(10) Patent No.: US 12,772,111 B2
(45) Date of Patent: Oct. 20, 2026

(54) SYSTEM AND METHOD FOR PROVIDING LOW LATENCY HIGH THROUGHPUT COMMUNICATIONS BETWEEN MOBILE CRANES

(71) Applicant: Buckeye Mountain, Inc., Akron, OH (US)

(72) Inventors: Steven Hill, Akron, OH (US); Greg Dunnell, Akron, OH (US)

(73) Assignee: Buckeye Mountain, Inc., Akron, OH (US)

( * ) Notice: Subject to any disclaimer, the term of this patent is extended or adjusted under 35 U.S.C. 154(b) by 269 days.

(21) Appl. No.: 18/481,017

(22) Filed: Oct. 4, 2023

(65) Prior Publication Data

US 2024/0114395 A1 Apr. 4, 2024

Related U.S. Application Data

(60) Provisional application No. 63/413,213, filed on Oct. 4, 2022.

(51) Int. Cl.

| | |
|---|---|
| ***H04W 40/22*** | (2009.01) |
| ***H04B 7/10*** | (2017.01) |
| ***H04B 7/14*** | (2006.01) |
| ***H04L 67/12*** | (2022.01) |
| ***H04W 28/10*** | (2009.01) |
| ***H04W 88/04*** | (2009.01) |

(52) U.S. Cl.

CPC ............. *H04W 28/10* (2013.01); *H04L 67/12* (2013.01)

(58) Field of Classification Search

CPC ..... H04W 28/10; H04W 40/22; H04W 88/04; H04L 67/12; H04B 7/10; H04B 7/15542; H04B 7/14; H04B 7/15507

See application file for complete search history.

(56) References Cited

U.S. PATENT DOCUMENTS

| | | | | |
|---|---|---|---|---|
| 8,827,091 | B2 * | 9/2014 | Yokoyama | B66C 23/62 212/181 |
| 11,949,555 | B2 * | 4/2024 | Lumbatis | H04W 16/26 |
| 2005/0013616 | A1 * | 1/2005 | Yen | H04B 10/1123 398/130 |
| 2005/0242052 | A1 | 11/2005 | O'Connor et al. | |
| 2008/0154752 | A1 | 6/2008 | Zakula et al. | |
| 2010/0021272 | A1 | 1/2010 | Ward et al. | |
| 2014/0266875 | A1 * | 9/2014 | Cameron | G01S 19/53 342/357.36 |
| 2014/0365848 | A1 * | 12/2014 | Roh | H04W 72/21 714/784 |
| 2015/0124660 | A1 * | 5/2015 | Sturkovich | H04B 7/10 370/273 |

(Continued)

OTHER PUBLICATIONS

"Technical Description Ship to Shore Gantry Cranes" Liebherr Container Cranes Ltd. www.liebherr.com/shared/media/maritime-cranes/downloads-and-brochures/brochures/lcc/liebherr-sts-cranes-technical-description.pdf, Jul. 7, 2022.

(Continued)

*Primary Examiner* — Andrew Wendell

(74) *Attorney, Agent, or Firm* — Nixon & Vanderhye P.C.

(57) ABSTRACT

Crane mounted 60 GHz radios designed for fixed point-to-point service provide for extremely high transport speeds, very low latency and low jitter. Incorporating a unique set of configurations on both the radios and the ethernet switching infrastructure, highly reliable performance is achieved in a low-speed mobility application. The solution also provides for backup power, telemetry and remote management.

19 Claims, 10 Drawing Sheets

(56) References Cited

U.S. PATENT DOCUMENTS

| | | | | |
|---|---|---|---|---|
| 2017/0055298 | A1* | 2/2017 | Pawar | H04L 5/1469 |
| 2018/0072542 | A1 | 3/2018 | Ishikawa | |
| 2019/0319345 | A1* | 10/2019 | Bell | H01Q 9/0407 |
| 2021/0347627 | A1* | 11/2021 | Maclean | B67D 1/0882 |
| 2022/0019960 | A1 | 1/2022 | Skomra et al. | |
| 2022/0073320 | A1 | 3/2022 | Miyata et al. | |
| 2022/0089416 | A1* | 3/2022 | Guymon | B63B 27/10 |
| 2023/0227079 | A1 | 7/2023 | Graham | |

OTHER PUBLICATIONS

"Rubber Tyred Gantry Crane" Weihua www.weihuacraneglobal.com/product/Rubber-Tyred-Container-Gantry-Crane--Rubber-Tyred-Gantry-Crane.html, Sep. 26, 2022.

Weigmans et al, Intermodal freight terminals: an analysis of the terminal market, Transportation Planning and Technology vol. 23,—Issue 2: Intermodality and Sustainable Freight Transport, doi.org/10.1080/03081069908717643, 1999.

"Cisco Ultra-Reliable Wireless Backhaul" www.cisco.com/c/en/us/products/wireless/ultra-reliable-wireless-backhaul/index.html, Sep. 27, 2022.

"Terminal Operations Digitization and Security Solution Brief" www.cisco.com/c/en/us/solutions/collateral/internet-of-things/terminal-ops-digitization-security-sb.html, Oct. 13, 2022.

Roy et al, Optimal Design of Container Terminal Layout, 12th IMHRC Proceedings (Gardanne, France—2012).

International Search Report and Written Opinion issued in PCT/US2023/75958 mailed Feb. 27, 2024.

Kan et al., "Experimentation to Support Real-Time Monitoring of Mobile Crane Operations", Sep. 25, 2019.

* cited by examiner

Crane System Architecture

SYSTEM AND METHOD FOR PROVIDING LOW LATENCY HIGH THROUGHPUT COMMUNICATIONS BETWEEN MOBILE CRANES

CROSS-REFERENCES TO RELATED APPLICATIONS

The present application claims the benefit of U.S. Provisional Patent Application No. 63/413,213, filed Oct. 4, 2022, which is incorporated herein by reference in its entirety and for all purposes.

FIELD

The technology herein relates to digital communications to/from cranes and other heavy equipment that move intermodal shipping containers, and more particularly to wireless backhauls such as for seaports and railway stations. Still more particularly, the technology herein relates to a high frequency wireless communication system for enabling reliable, available, low latency, low jitter digital communication with mobile/movable cranes of the type found for example in seaports and railroad yards.

BACKGROUND

Standard 20 ft and 40 ft intermodal shipping containers are used to transport the majority of dry cargo across the globe. Such containers are made of steel and have different loaded weights depending on the cargo inside—with the maximum weight of a container being 67,200 lbs (over 33 tons).

The containers are "intermodal" because they can be carried by different transport means (e.g., train, ship, truck). Any given container often is transported by two or more such transport means during its travel from source to destination. Such containers thus often need to be transferred from one transport means to another, e.g., from a tractor-trailer (truck) to a railway freight car and/or a container ship to a different tractor-trailer. Such containers are much too large and heavy to be lifted by a forklift—they instead must be lifted, moved and lowered by special heavy container handling equipment such as specially designed cranes.

Examples of such specialized handling equipment are ship-to-shore cranes and gantry cranes. The latter are called "gantry cranes" because of a distinctive gantry overhead frame structure. Such cranes are often immense (e.g., over 100 feet tall). Some gantry cranes may move on rubber tires. Other gantry cranes (automated rail mounted gantry cranes) are anchored to and move back and forth on rails. High voltage electricity is typically supplied to operate AC or DC electric motors that move the cranes on the rails, move booms and trollies, etc. See for example "Technical Description Ship to Shore Gantry Cranes" Liebherr Container Cranes Ltd. www.liebherr.com/shared/media/maritime-cranes/downloads-and-brochures/brochures/lcc/liebherr-sts-cranes-technical-description.pdf; www.weihuacraneglobal-.com/product/Rubber-Tyred-Container-Gantry-Crane-Rubber-Tyred-Gantry-Crane.html; US20230227079; US 20220019960; US 20100021272; Weigmans et al, Intermodal freight terminals: an analysis of the terminal market, Transportation Planning and Technology Volume 23, 1999—Issue 2: Intermodality and Sustainable Freight Transport, doi.org/10.1080/03081069908717643.

The gantry crane rails can in some yards be very long—e.g., on the order of 2 miles long. Many such gantry cranes may share the same rails, each moving independently back and forth along the rails to lift containers from one transport platform (e.g., from a truck) and lower them onto another transport platform (e.g., a ship or train)—or vice versa. Precautions are taken to ensure the cranes do not collide with one another.

Such cranes typically have weatherproof cabs that house crane operators. The operator of a crane typically uses joystick style controls to move the crane into correct positions, and control booms and other mechanisms that lift and lower containers. Some such cranes are now remotely controlled by an operator sitting in a climate controlled office connected to the crane by a data network. The remote operator may view displays of cameras mounted on the crane and provide inputs to remotely control the crane. Some have also experimented with autonomous robotic operation of such cranes or gantry robots. Thus, a great deal of modern digital technology is currently found onboard modern gantry cranes—many processors, cameras and other imaging sensors, other kinds of digital or digitally sampled sensors, actuators, motor controllers, safety/anticollision equipment, etc.

Because of the extensive amount of data processing and digital imaging performed by a typical crane, there is a longfelt need to provide a wireless network solution to address the high speed, low latency, high throughput requirements of the remote and mobile operations of cranes at Seaports and Railways.

However, the common use of Profinet, an industry technical standard for data over Industrial Ethernet that requires low latency and low jitter, in these systems makes the use of wireless networks challenging. See "PROFINET System Description". PROFIBUS Nutzerorganisation e.V. October 2014; "PROFIsafe System Description". Documentation. Profinet International. 2016, Order Number 4.132; Manfred Popp. Industrial communication with PROFINET. PROFIBUS Nutzerorganisation e.V. (PNO). Order no.: 4.182; www.profibus.com/technology.

Traditional approaches to meet these Profinet requirements are to use highly reliable high bandwidth fiber optic data links to connect each crane to an end point. However, maintaining optical fiber to cranes or other points of a seaport or railway switchyard can be expensive and lead to problems of unreliability when one or more of the optical fibers is compromised. As noted above, cranes are constantly in motion and some crane tracks are miles long—meaning that optical fibers connecting the cranes to a terrestrial network end point must be able to connect to a mobile crane moving rapidly over great distances in often harsh coastal or other outdoor environments.

Because of the difficulties in maintaining fiber optic cable connections, wireless solutions would appear to be promising for mobile crane network connectivity. Cisco Ultra-Reliable Low-Latency Wireless Backhaul (formerly Fluidmesh) has been the choice of many operators for wireless backhauls for these cranes due to their developments in incorporating MPLS (Multi-protocol label switching) to create a "make before break" solution during roaming events. See www.cisco.com/c/en/us/products/wireless/ultra-reliable-wireless-backhaul/index.html and www.cisco.com/c/en/us/solutions/collateral/internet-of-things/terminal-ops-digitization-security-sb.htl. Such solutions are designed to support the reference architectures described in ANSI/ISA-95 Enterprise-Control System Integration (known internationally as IEC/ISO 62264).

These wireless installations unfortunately have not always lived up to expectations due among other reasons to inherent limitations of the unlicensed radios operating in the 5.X GHz spectrums. Some in the industry have therefore experienced problems in terms of reliability, availability, high latency, unacceptably high jitter, low throughput, and/or routing issues. Additional solutions are desirable.

DETAILED DESCRIPTION OF EXAMPLE NON-LIMITING EMBODIMENTS

Example non-limiting embodiments of a "RapidCrane" system and method herein uses a different approach by having each crane in a linear installation (i.e., a linear array of cranes) communicate with cranes immediately adjacent thereto and at the ends of the installation to purpose-built towers. Thus, rather than following conventional wisdom of a "mesh" providing many routing paths through the network, the example non-limiting technology herein purposefully constrains routing along a linear area of crane-mounted radio transceivers to achieve higher reliability. In one example embodiment, each crane wirelessly communicates with a maximum of two other entities; one entity is another crane, and the other entity is either another crane or a fixed end point. An analogy is a "bucket brigade" where each person in the brigade receives water from the person on one side and provides water to the person on the other side, without skipping the line. In this example embodiment, the entity on one side is another crane, and the entity on the other side is either yet another crane or a fixed end point depending on position in line.

One embodiment of RapidCrane uses 60 GHz radios designed for fixed point to point service which provides for extremely high transport speeds, very low latency and low jitter. Incorporating a unique set of configurations on both the radios and the ethernet switching infrastructure, highly reliable performance is achieved in a low-speed mobility application. This 60 GHz spectrum is unlicensed, but unlike frequencies such as 6 GHz, it contains up to 9 GHz of available bandwidth. Moreover, the high frequency allows for very narrow and focused antenna patterns that are resistant to interference, but require accurate line of sight (LOS) paths. Commercial parts are available to build a complete 60 GHz two-way data communication link. See e.g., Kilpatrick, "60 GHz Line Of Sight Backhaul Links Ready To Boost Cellular Capacity", Analog Devices (2020). Building on our RapidMiniMax hardware, the solution herein also provides for backup power, telemetry and remote management.

Figure 1A:
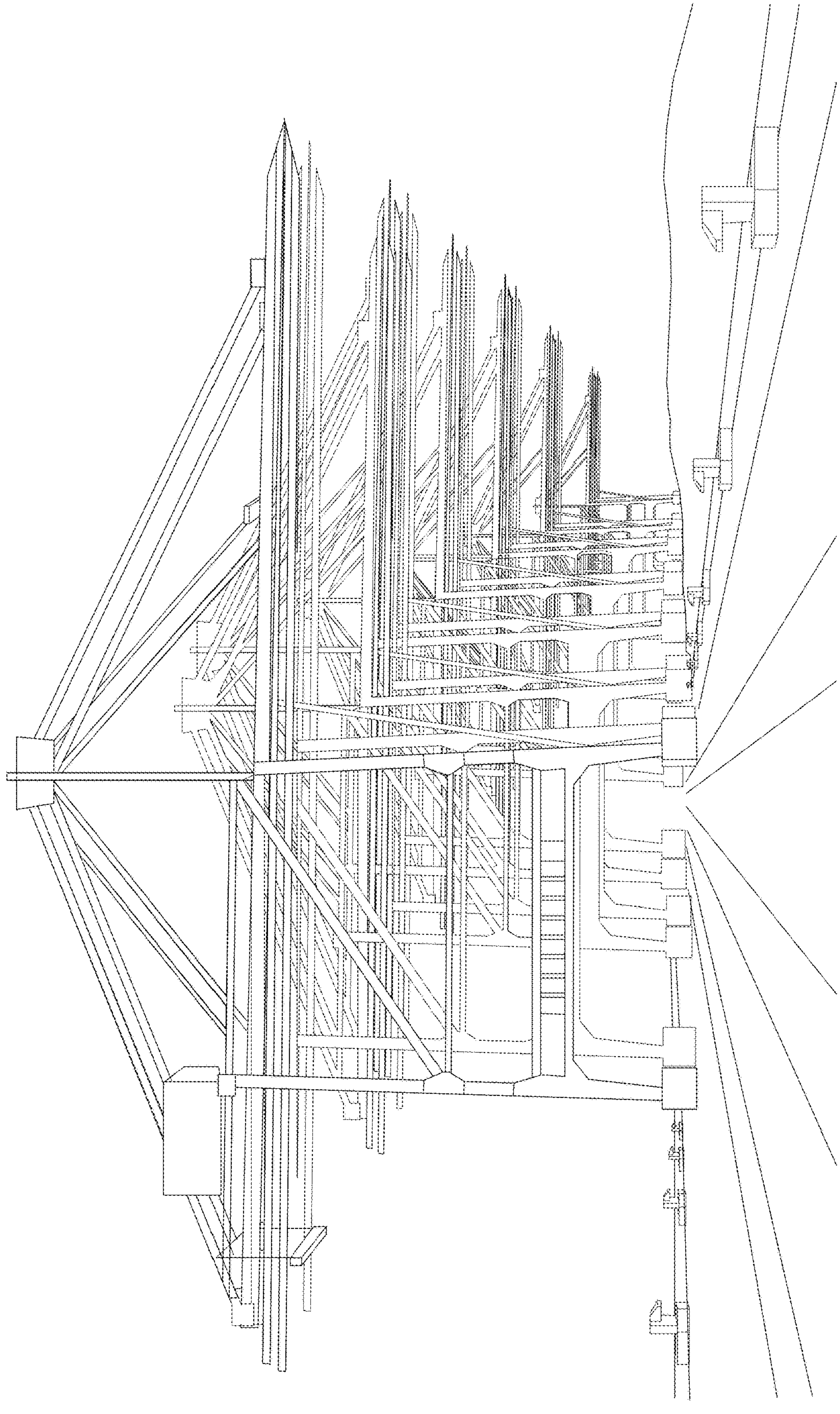
FIG. 1A shows an example linear array of ship to shore cranes.
Figure 1B:
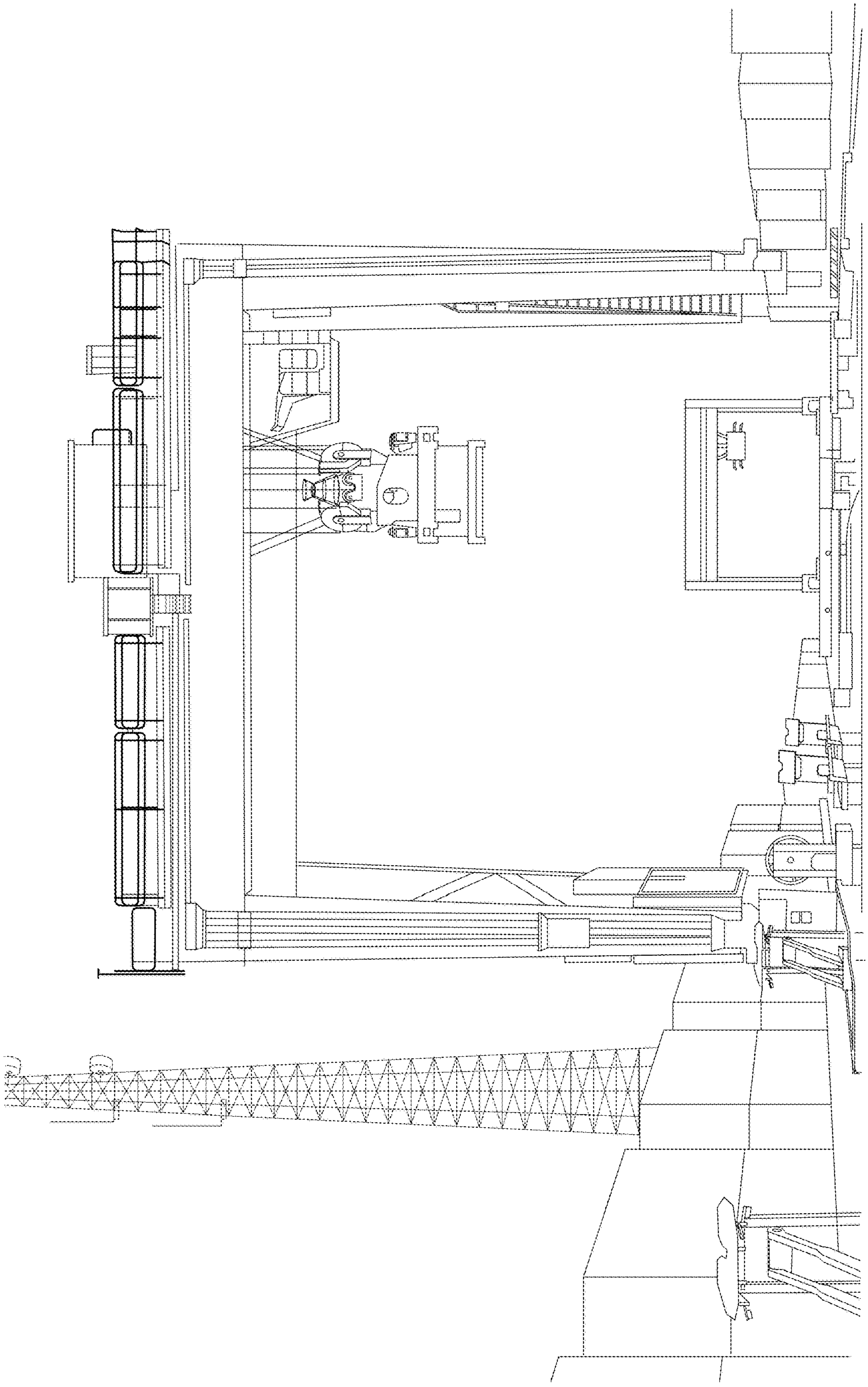
FIG. 1B shows an example linear array of rail mounted gantry cranes.
Figure 1C:
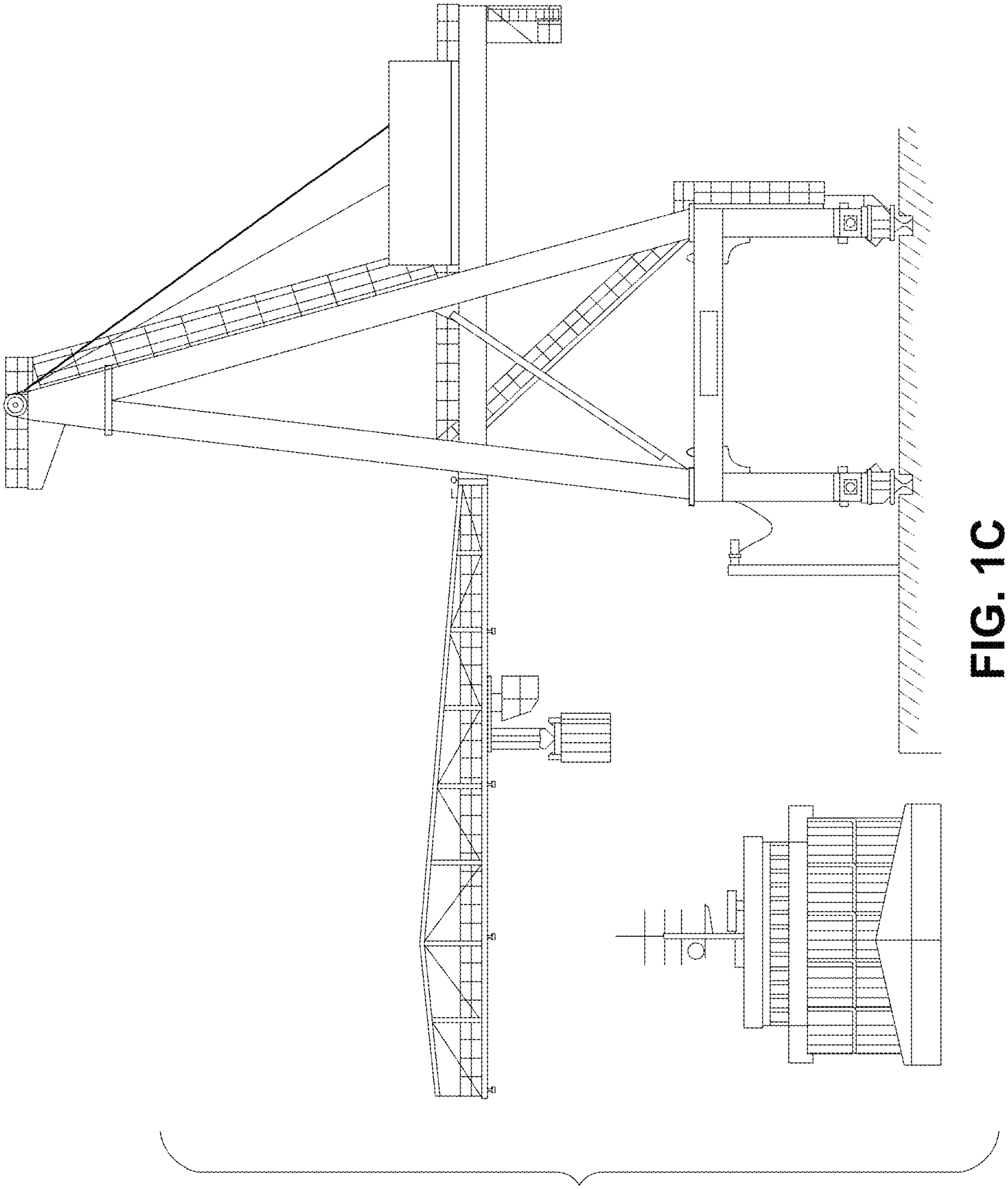
FIG. 1C schematically shows an example crane.

FIGS. 1A, 1B and 1C show example intermodal terminals with a long linear arrays of cranes uses for loading containers onto and unloading containers from transport platforms such as ships, trains and trucks. The cranes are placed in a linear array (e.g., on rails) along a quay or road with towers on each end of the linear array. See e.g., Roy et al, Optimal Design of Container Terminal Layout, 12th IMHRC Proceedings (Gardanne, France—2012). FIG. 1C shows an example crane including trolley wheels mounted on rails, a massive upright structure including a gantry, a boom, an operators cabin, and various mechanisms for lifting and lowering intermodal containers. Vehicles move along the linear dimension of the array to transport containers between the cranes and also between the cranes and container storage areas in the terminal. In addition, in some embodiments the cranes move linearly along rails or on rubber tires to carry containers from a source transport platform to a destination transport platform.

Each crane has numerous electronic systems including sensors, cameras, processors, controls, etc. that need to be connected reliably and with very low latency and jitter to electronic systems and infrastructure external of the crane. Current cranes typically interface with an optical fiber cable supporting highly reliable high bandwidth ethernet as discussed above.

The example non-limiting technology herein provides seamless wireless connectivity between (to/from) such mobile cranes and between a wireless backhaul supported by the terminal infrastructure and a variety of moving radio stations such as autonomous vehicles (robots), tablets of vehicle users, crane operators, crane cameras, ship-board personnel, and more.

Figure 2:
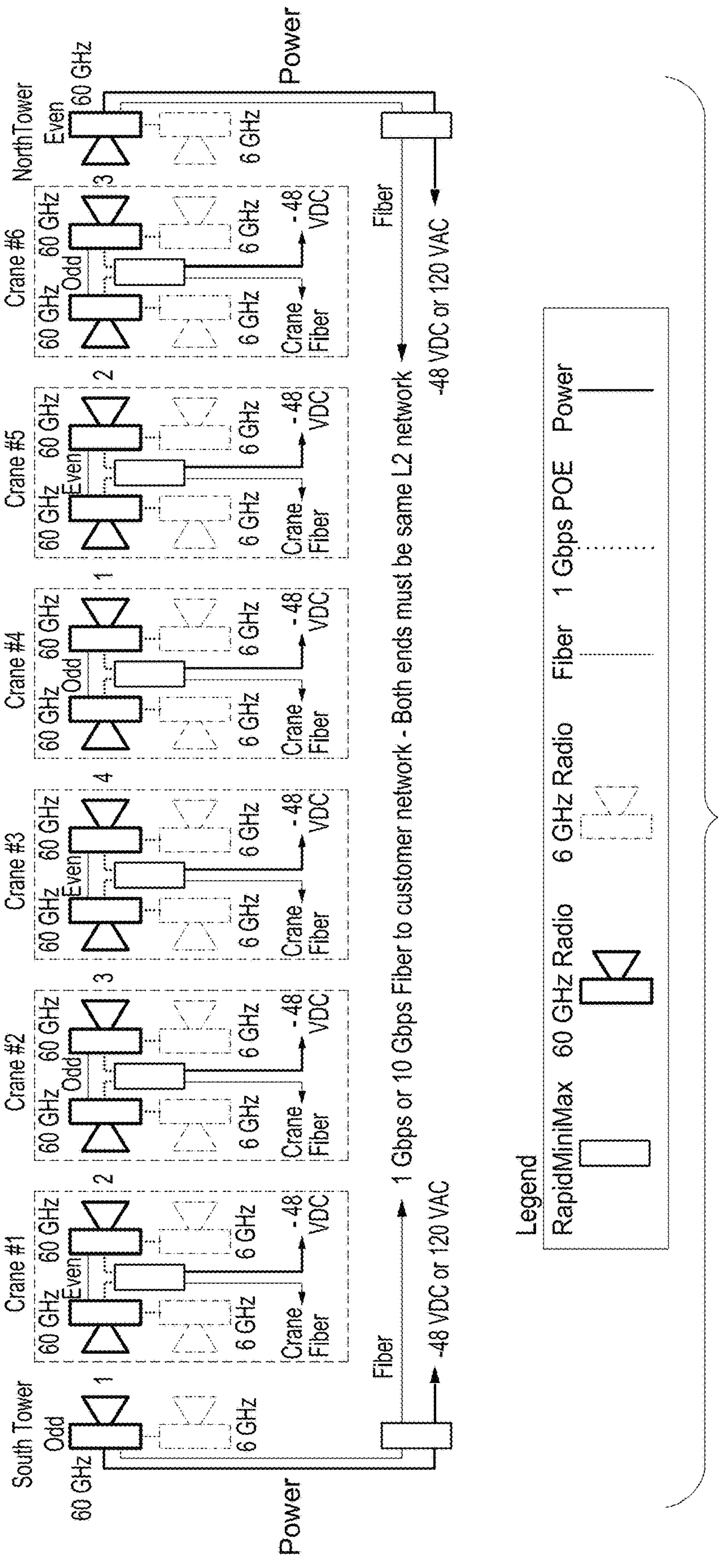
FIG. 2 shows an example architecture.

FIG. 2 shows an example non-limiting implementation of an architecture including a fixed-position south tower, a fixed-position north tower, and any number of cranes therebetween. The cranes are typically arranged along a path (which may or may not be linear but will often be linear along a rail) between the end towers. In some embodiments, the cranes move linearly on rails between the towers. In example embodiments, the wireless backhaul provides wireless connectivity between the towers across all the cranes.

In the example shown, each crane is provided with fiber connectivity as well as power. Part of the wireless installation on each crane includes conventional optional 6 GHz Wi-Fi transceivers used to communicate with tablets, vehicles, etc. Example embodiments meanwhile provide 60 GHz radio connectivity (indicated by the antenna horns along the top of the Figure) that provide a backhaul for establishing connectivity between the cranes (and in one example between existing 6 GHz Wi-Fi transceivers and associated on-crane networking and associated equipment).

In the example shown, each crane has disposed thereon (e.g., at the top of the gantry) a pair of 60 GHz transceivers and associated highly directional antenna horns that act as a repeater or relay. See FIGS. 4, 4A. The transceivers of a given crane thus receive 60 GHz radio signals from a "next" or adjacent crane more distant from a signal destination tower than the given crane and relay those 60 GHz signals toward the destination tower—either directly or through another crane transceiver of a crane closer to the destination tower. Thus in this embodiment, each crane can relay signals received from another crane as well as send/receive signals on its own behalf, although some of the cranes (e.g., cranes 3 and 4) do not need to act as relays under normal or typical operation. For example, in one use case, crane 3 will send to crane 2 which will relay to crane 1 which will relay to the south tower; and crane 4 will send to crane 5 which will relay to crane 6 which will relay to the north tower. Thus, in example embodiments, certain crane installations may have an operating mode in which they do not need to relay to a next crane, signals received from another crane. On the other hand, as discussed below, the crane installation can adapt to changed conditions to reconfigure itself to operate in a different operating mode in which it does begin relaying to a next crane, signals received from another crane—and that "next crane" can change from an adjacent crane on one side to an adjacent crane on another side.

The transceiving equipment also relays signals transmitted by the towers to the sequence of cranes in the same sequence as noted above, i.e., each pair of 60 GHz transceivers atop each crane is a bidirectional relay providing bidirectional connectivity.

Each tower is connected to a customer terrestrial or other network as shown and so it can source as well as receive digital signals for wireless propagation over the backhaul network. Thus, in the examples shown, the end towers each have 60 GHz radio transceivers connected to a terrestrial fiber network connecting the towers with other terrestrial network equipment such as the Internet, remote control equipment, etc. In one embodiment, the towers each need only one antenna aimed at a nearest crane since the towers do not relay signals but instead each provide end points that transmit and receive signals.

An example embodiment may provide adaptive reconfiguration to select the highest reliability and/or lowest latency path for sending and receiving signals. For example, if crane 5's transceiver fails to relay crane 4's traffic acceptably for receipt by the north tower or acceptably relay signals originating from the north tower, the system can automatically reconfigure itself (e.g., in response to a detecting a failed "ping" response as shown in FIG. 4B) so crane 4 instead begins sending to and receiving from crane 3 which will relay to/from crane 2 which will relay to/from crane 1 which will relay to/from the south tower. In one example, the south tower will communicate traffic to/from crane 4 over optical fiber to the north tower which will continue to provide crane 4 traffic to/from the terrestrial network from the same IP address to hide the reconfiguration from the network, thereby minimizing disruption.

In example embodiments, each crane has a pair of independently operable 60 GHz transceivers aimed in different (in some embodiments opposite) directions. In example embodiments, the 60 GHz transceivers on the cranes communicate wirelessly with transceivers on adjacent crane or tower structures. For example, the pair of 60 GHz transceivers on crane #1 communicate with the south tower 60 GHz transceiver and the crane #2 60 GHz transceiver, respectively; the pair of 60 GHz transceivers on crane #2 communicate with the 60 GHz transceivers on cranes nos. 1 and 3 respectively, and so on. The crane-top equipment thus forms a point-to-point backhaul network comprising a sequence of 60 GHz radio relays terminating in respective end towers, with each crane-top equipment installation being capable of communicating traffic both to/from the crane it is installed on and to relay traffic to/from another crane-top equipment installation. In many installations, such a 60 GHz radio network will provide less than 1 msec of latency delay or less than 10 msec of latency delay or less than 9 msec of latency delay or less than 8 msec of latency delay or less than 7 msec of latency delay or less than 6 msec of latency delay or less than 5 msec of latency delay or less than 4 msec of latency delay or less than 3 msec of latency delay or less than 2 msec of latency delay. Such a 60 GHz radio network thus provides fiber-like performance in terms of low latency, low jitter, high bandwidth, availability and reliability.

Figure 3:
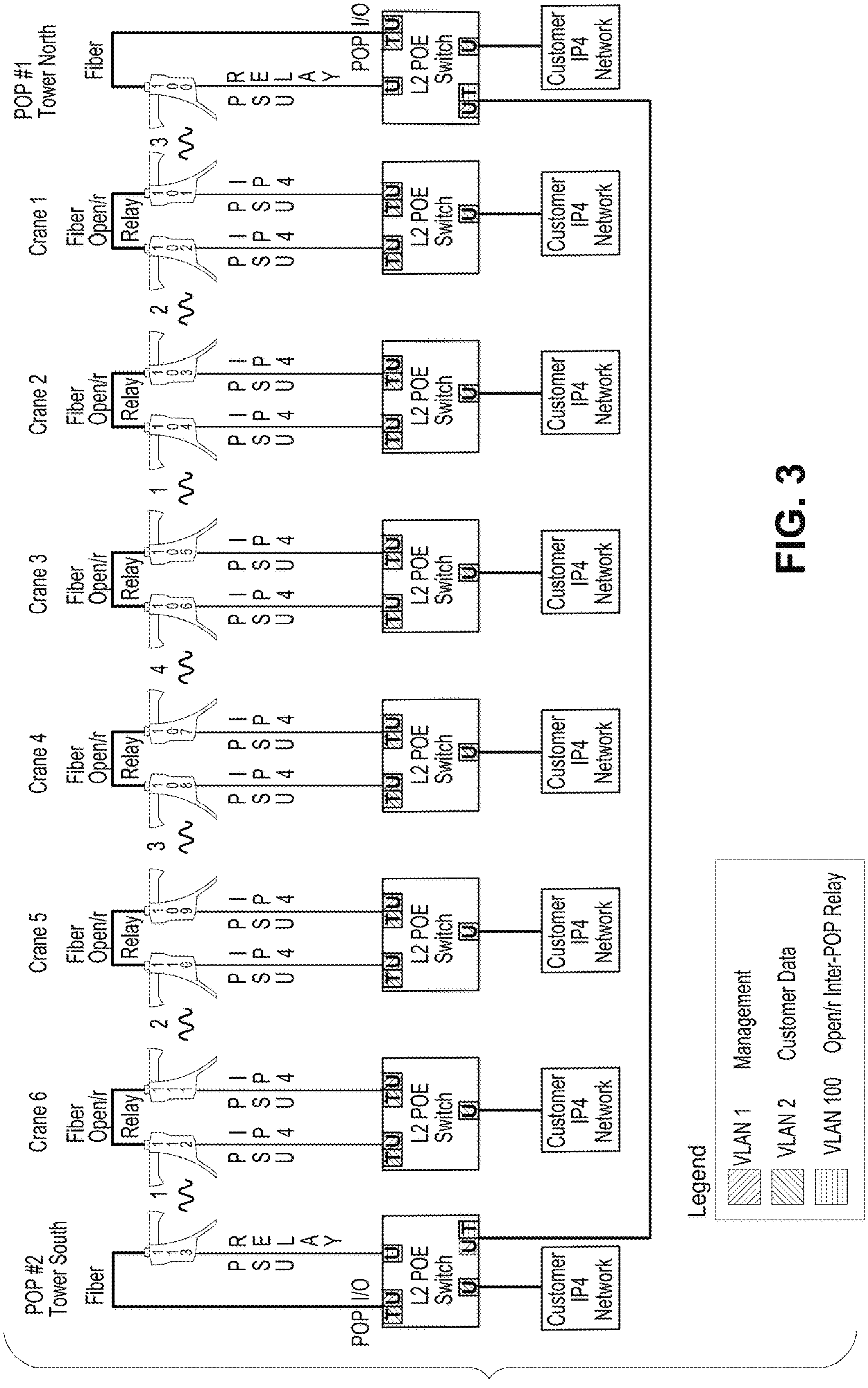
FIG. 3 shows a more detailed example architecture.

FIG. 3 shows a more detailed architecture diagrams showing how the 60 GHz transceivers relay data transmissions to one another to provide a backhaul network between a fiber connection on one end tower and a fiber connection on the other end tower; and further provide data connectivity to switches and conventional Wi-Fi networks also provided on each crane and each tower.

Figure 4:
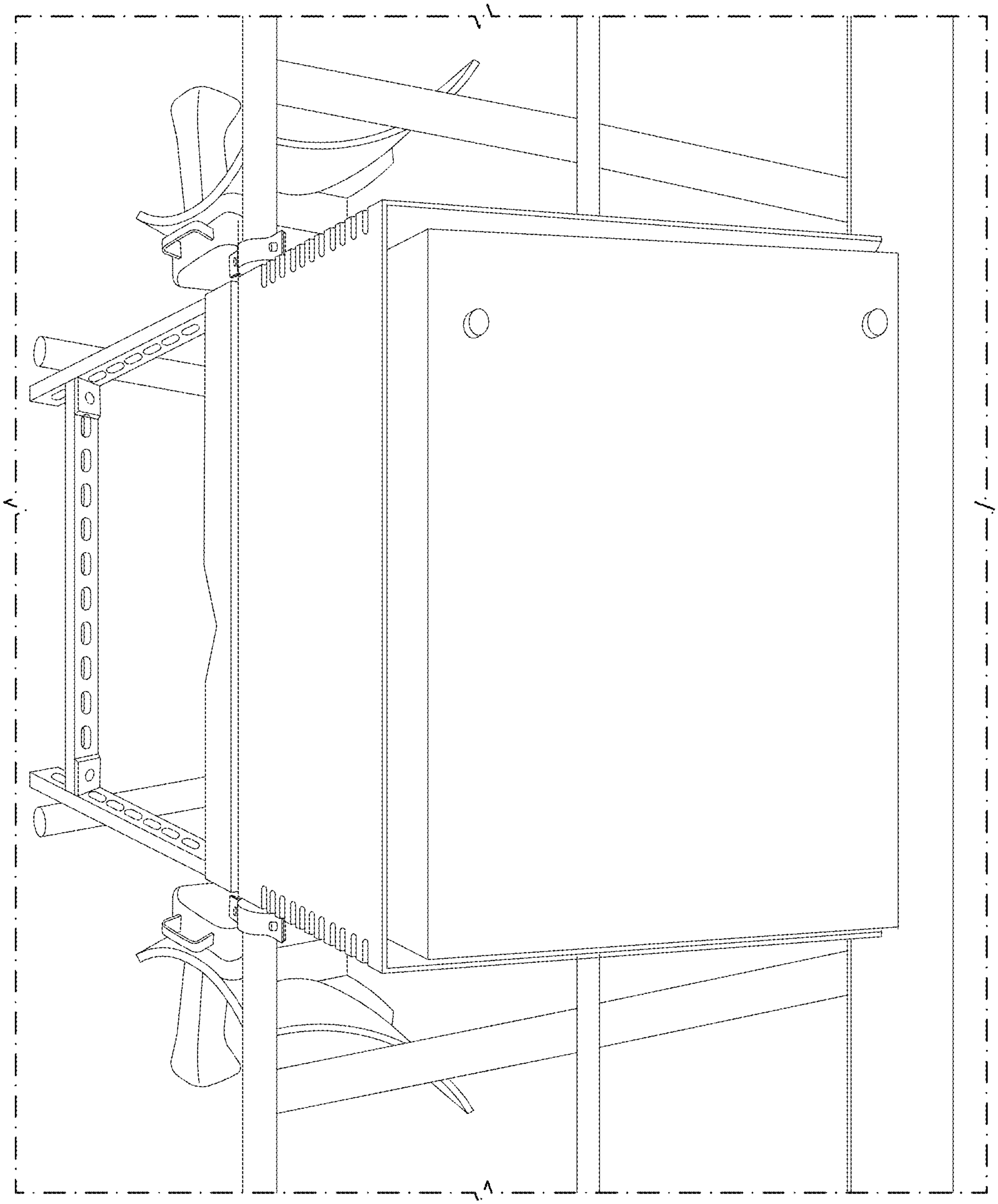
FIG. 4 shows an example crane-top installation including a weatherproof housing with 60 GHz antenna horns aimed in opposite directions.
Figure 4A:
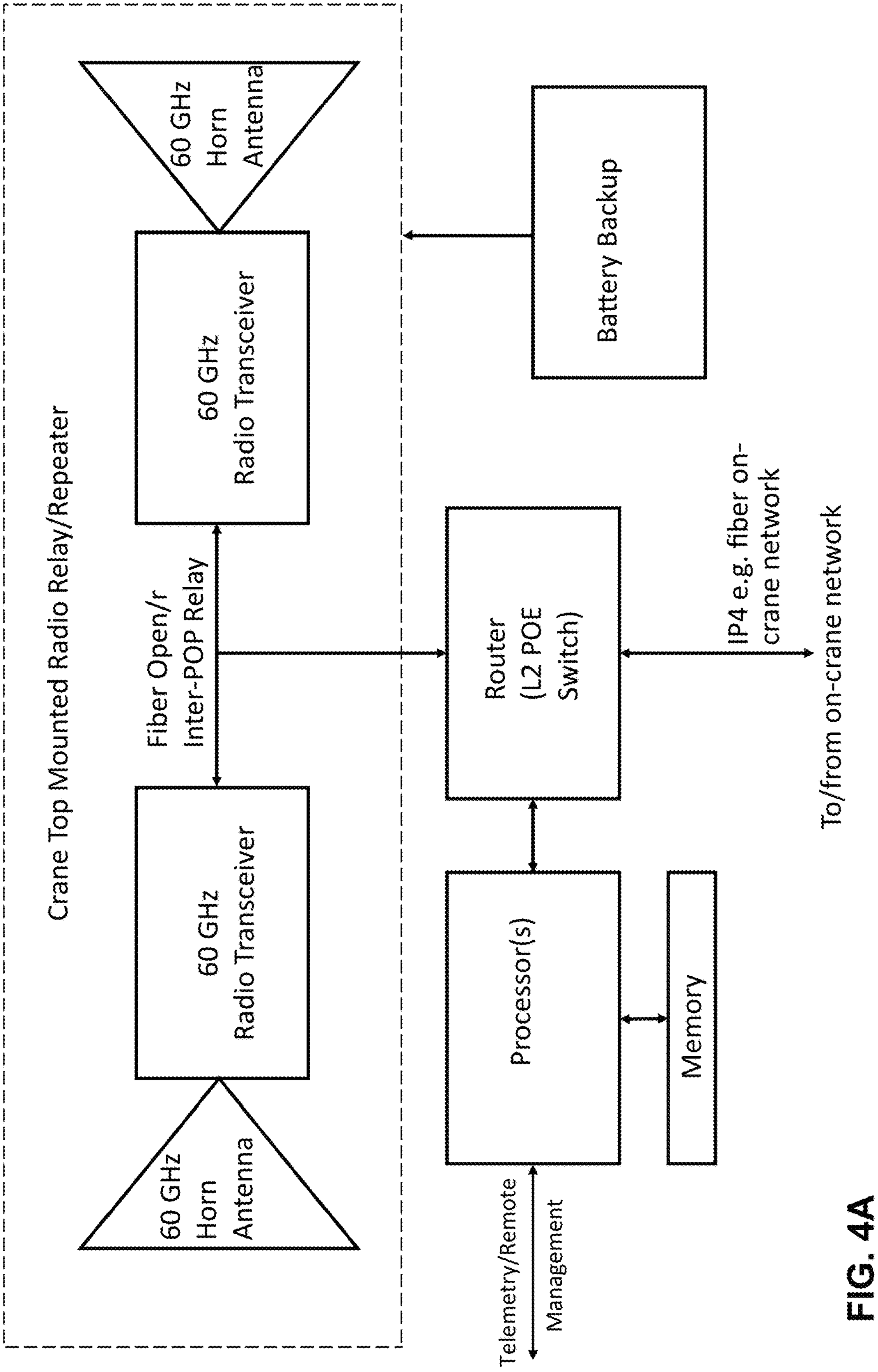
FIG. 4A shows an example schematic block diagram of a crane-top installation.
Figure 4B:
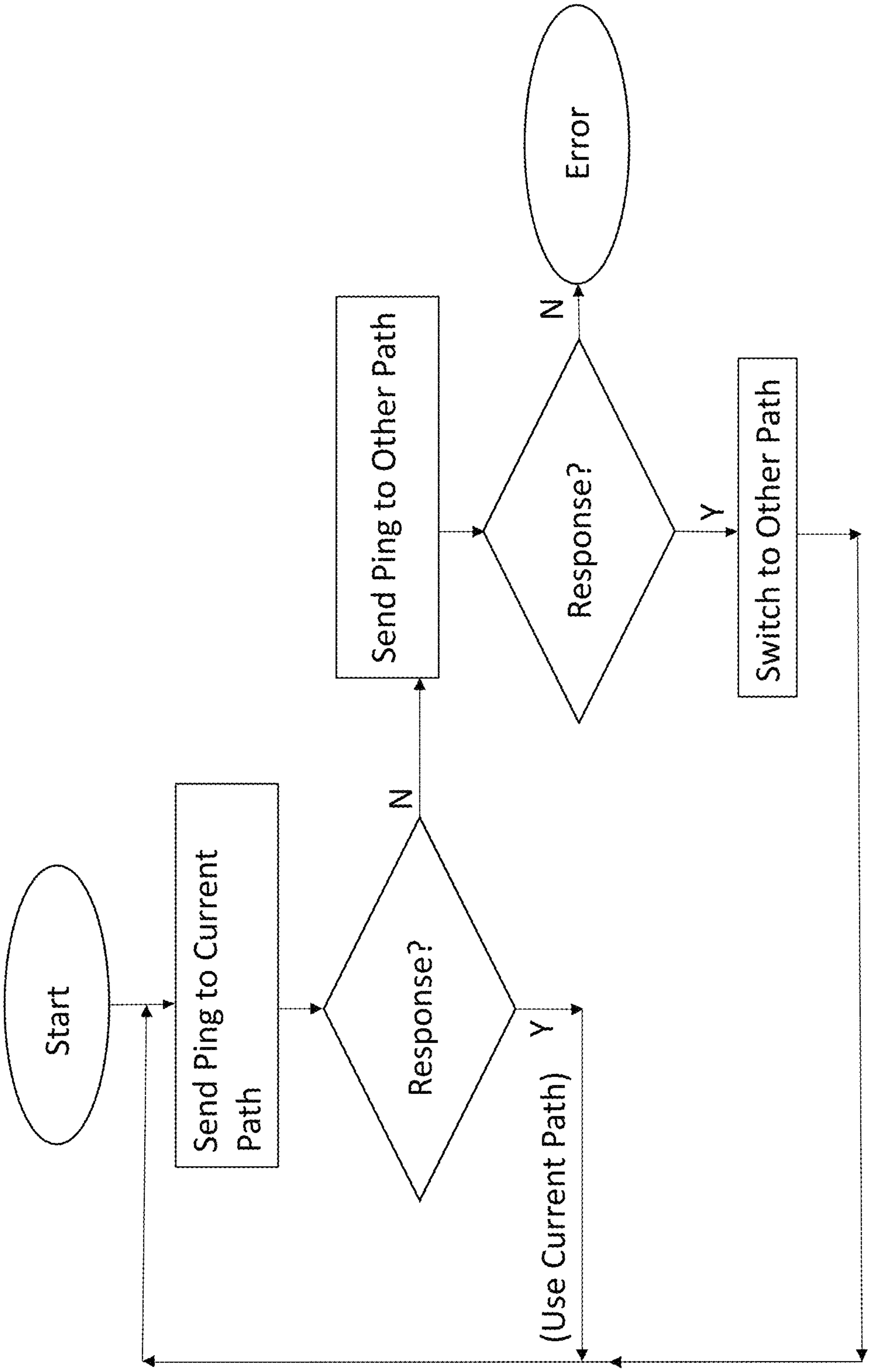
FIG. 4B shows an example flowchart of program control steps performed by the processor of FIG. 4A in response to instructions stored in non-transitory memory.

FIG. 4 shows an example 60 GHz installation on a crane, with a pair of horn antennas aimed in substantially opposite directions from one another, and a weatherproof housing containing 60 GHz radio transceivers and connectivity therebetween. In other word, each crane has mounted thereon a first microwave horn antenna and a second microwave horn antenna, wherein the first and second microwave horn antennas are aligned along a common axis and aim in opposite directions. In other words, the horn antennas are aligned so their beam radiation patterns are 180 degrees apart in azimuth and at the same elevation which may be close to or exactly horizontal.

Figure 5:
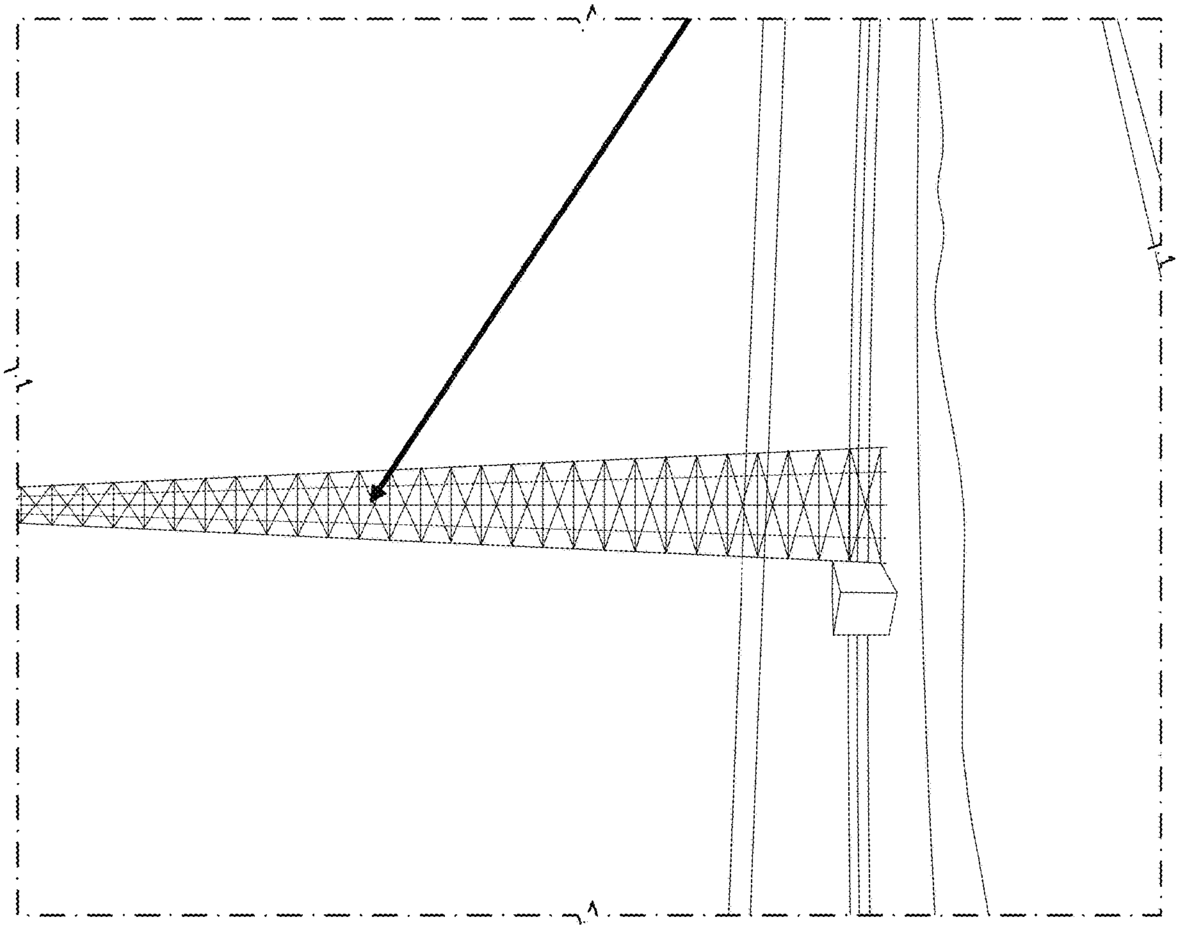
FIG. 5 shows an example use of laser alignment of a crane mounted antenna to a tower mounted antenna.
Figure 6:
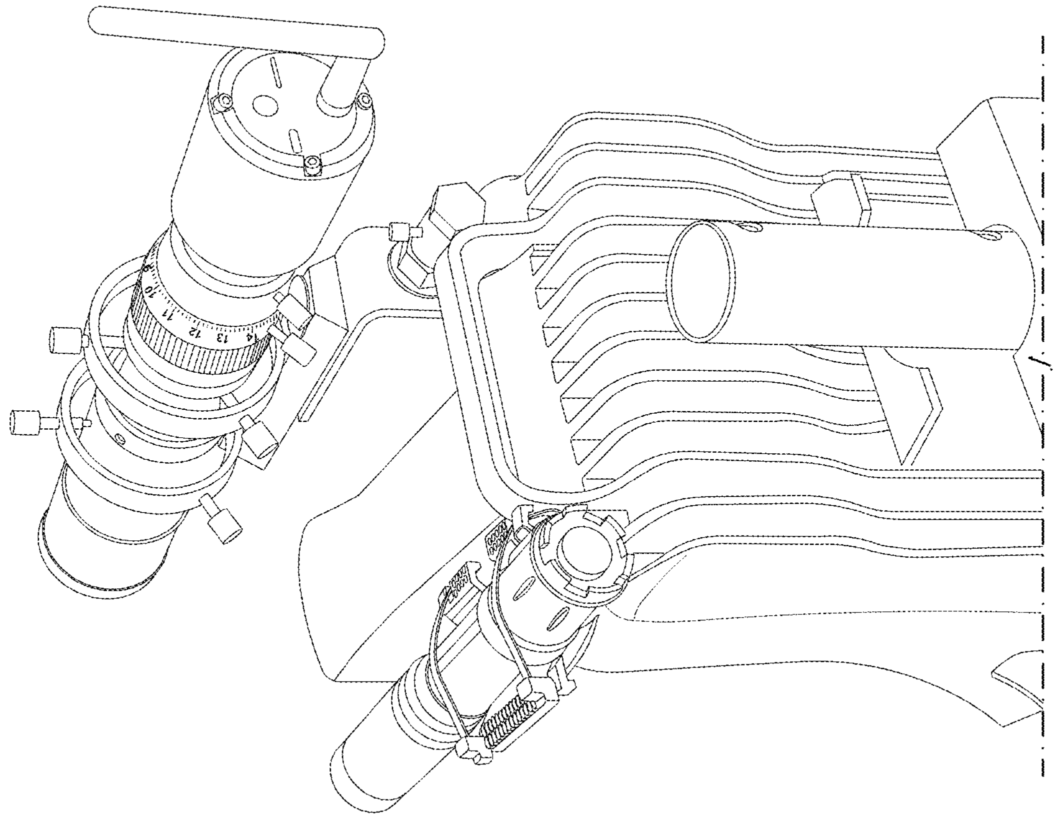
FIG. 6 shows example laser and imaging equipment for laser alignment of 60 GHz antenna horns.

In example embodiments, such 60 GHz communications is thus provided by point-to-point horn antennas mounted on the cranes and towers and aimed at one another. Another unique installation technique makes use of a high-power laser to adjust the azimuths of the radio antennas of adjacent cranes. See FIGS. 5 and 6. This results in ultra-accurate antenna alignments. This process eliminates the time consuming and often challenging manual adjustments which might otherwise require technicians at both ends of the radio path to work together. FIG. 6 in particular shows a high power laser (on the left) that is precision-mounted to the horn antenna, and a camera (on the right) that is also precision-mounted to the horn antenna. The laser provides a high power collimated beam that is coincident with the horn antenna's highly directional, narrow beam major radiation lobe. In some cases the 60 GHz beam on a Smith chart may be only 2 degrees wide. The camera uses an optical sight to provide a magnified image of the target of the laser beam, and provides signals wirelessly to a smart phone or tablet so a technician can view the image without having to look directly at the laser. The technician can manually adjust the position of the horn antenna in minute increments to aim both the horn antenna's narrow beam and the laser beam directly at the horn antenna mounted on an adjacent crane (or, in the case of cranes 1 and 6 in this example, mounted on the south and north towers, respectively—see FIG. 5).

All patents and publications cited herein are incorporated by reference at least for purposes of enablement and context.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A wireless backhaul comprising:

a first microwave directional antenna configured for mounting on a first crane, the first microwave directional antenna configurable for aiming at a first fixed backhaul tower microwave antenna, a second microwave directional antenna configured for mounting on the first crane, wherein the first and second microwave directional antennas are configurable for being aimed in opposite directions, the second microwave directional antenna being configurable for aiming from the first crane towards a third directional microwave antenna on a second crane, the third microwave directional antenna configured for mounting on the second crane and configurable for aiming at the second microwave directional antenna on the first crane, a fourth microwave directional antenna configured for mounting on the second crane;

a first end crane microwave antenna configured for mounting on an end crane and configurable for aiming at the fourth microwave directional antenna on the second crane or alternatively at a further microwave directional antenna mounted on a crane between the second crane and the end crane, a second end crane microwave antenna configured for mounting on the end crane and configurable for aiming at a second fixed backhaul tower microwave antenna, and transceiver equipment connected to the first microwave directional antenna and the second microwave directional antenna, the transceiver equipment configured to be capable of (a) relaying to the second microwave directional antenna, data the first microwave directional antenna receives, (b) relaying to the first microwave directional antenna, data the second microwave directional antenna receives, and (c) transmitting data to and/or receiving data from digital equipment disposed on the first crane.

2. The wireless backhaul of claim 1 wherein at least one of the first microwave directional antenna and the second microwave directional antenna is laser-alignable.

3. The wireless backhaul of claim 1 wherein at least one of the first microwave directional antenna and the second microwave directional antenna operates at 60 GHz.

4. The wireless backhaul of claim 1 wherein the wireless backhaul provides latency of less than 10 milliseconds and preferably less than 1 millisecond of latency delay.

5. The wireless backhaul of claim 1 wherein the transceiver equipment is further configured to change direction in which it relays received signals.

6. The wireless backhaul of claim 1 further including N additional cranes each having transceiving equipment, N a positive integer, wherein each of the N additional cranes wirelessly communicates with a maximum of two other cranes.

7. The wireless backhaul of claim 1 wherein the transceiver equipment for a sequence of cranes between the first fixed backhaul tower and the second fixed backhaul tower is configurable to be mountable at a location that has an unobstructed sight path to each adjacent crane or backhaul tower.

8. A wireless backhaul comprising:

a first microwave directional antenna configured for mounting on a crane, a second microwave directional antenna configured for mounting on the crane, wherein the first and second microwave directional antennas are aimed in opposite directions, and transceiver equipment connected to the first microwave directional antenna and the second microwave directional antenna, the transceiver equipment configured to be capable of (a) relaying to the second microwave directional antenna, data the first microwave directional antenna receives, (b) relaying to the first microwave directional antenna, data the second microwave directional antenna receives, and (c) transmitting data to and/or receiving data from digital equipment disposed on the crane, wherein the transceiver equipment is disposed at or near the top of the crane in a weatherproof housing providing a battery backup.

9. A wireless backhaul comprising:

a first microwave directional antenna configured for mounting on a first crane, a second microwave directional antenna configured for mounting on the first crane, wherein the first and second microwave directional antennas are aimed in opposite directions, and transceiver equipment connected to the first microwave directional antenna and the second microwave directional antenna, the transceiver equipment configured to be capable of (a) relaying to the second microwave directional antenna, data the first microwave directional antenna receives, (b) relaying to the first microwave directional antenna, data the second microwave directional antenna receives, and (c) transmitting data to and/or receiving data from digital equipment disposed on the first crane, wherein the first microwave directional antenna is configured for aiming at a second crane, and the second microwave directional antenna is configured for aiming at a third crane, wherein the first crane, the second crane and the third cranes are disposed along a common path.

10. The wireless backhaul of claim 9 wherein the first crane, the second crane and the third cranes are each configured to move along the common path.

11. A container loading facility comprising:

a first mobile crane having first radio transceiving equipment and a first container handling device installed thereon, a second mobile crane having second radio transceiving equipment and a second container handling device installed thereon, N additional mobile cranes each having transceiving equipment, where N is a positive integer, and a fixed tower having a third radio transceiving equipment installed thereon, wherein the first radio transceiving equipment is configured to operate in a mode that relays data between the second radio transceiving equipment and the third radio transceiving equipment with fiber-like performance in terms of low latency, low jitter, high bandwidth, availability and reliability, wherein each crane wirelessly communicates with a maximum of two other cranes or fixed towers.

12. The facility of claim 11 wherein the first and second mobile cranes are disposed and movable on a common rail.

13. The facility of claim 11 wherein the fixed tower provides network connectivity between the first and second cranes and a remote control facility providing control signals to the first and second cranes.

14. The facility of claim 11 wherein first, second and third radio transceiving equipments operate at 60 GHz.

15. The facility of claim 11 wherein the first, second and third radio transceiving equipment provide latency less than 10 millisecond and preferably less than 1 millisecond.

16. The facility of claim 11 wherein the first and second cranes each comprise mechanisms that move the crane along a path.

17. The facility of claim 11 wherein the first transceiving equipment is laser-aligned with the second and third transceiving equipment.

18. A container loading facility comprising:

a first mobile crane having first radio transceiving equipment and a first container handling device installed thereon, a second mobile crane having second radio transceiving equipment and a second container handling device installed thereon, and a first fixed tower having a third radio transceiving equipment installed thereon, wherein the first radio transceiving equipment is configured to operate in a first mode that relays data between the second radio transceiving equipment and the third radio transceiving equipment with fiber-like performance in terms of low latency, low jitter, high bandwidth, availability and reliability, and wherein the second radio transceiving equipment selectively operates in a second mode different from the first mode that relays signals received from the first radio transceiving equipment to fourth radio transceiving equipment disposed on a second fixed tower.

19. A container loading facility comprising:

a first fixed backhaul tower comprising a first fixed backhaul tower microwave antenna;

a second fixed backhaul tower comprising a second fixed backhaul tower microwave antenna;

a first crane;

a second crane;

an end crane;

a first microwave directional antenna on the first crane, the first microwave directional antenna aiming at the first fixed backhaul tower microwave antenna;

a second microwave directional antenna on the first crane, wherein the first and second microwave directional antennas are aimed in opposite directions, the second microwave directional antenna aiming from the first crane towards a third directional microwave antenna on the second crane;

the third microwave directional antenna on the second crane aiming at the second microwave directional antenna on the first crane;

a fourth microwave directional antenna on the second crane;

a first end crane microwave antenna on the end crane and aiming at the fourth microwave directional antenna on the second crane or alternatively at a further microwave directional antenna on a crane disposed between the second crane and the end crane, a second end crane microwave antenna on the end crane and aimed at the second fixed backhaul tower microwave antenna, and transceiver equipment connected to the first microwave directional antenna and the second microwave directional antenna, the transceiver equipment configured to be capable of (a) relaying to the second microwave directional antenna, data the first microwave directional antenna receives, (b) relaying to the first microwave directional antenna, data the second microwave directional antenna receives, and (c) transmitting data to and/or receiving data from digital equipment disposed on the first crane.

* * * * *